(12) United States Patent
Mikura et al.

(10) Patent No.: US 9,526,949 B2
(45) Date of Patent: Dec. 27, 2016

(54) GOLF BALL

(71) Applicant: Dunlop Sports Co., Ltd., Kobe-shi, Hyogo (JP)

(72) Inventors: Chiemi Mikura, Kobe (JP); Sho Goji, Kobe (JP)

(73) Assignee: DUNLOP SPORTS CO., LTD., Kobe-shi (JP)

(*) Notice: Subject to any disclaimer, the term of this patent is extended or adjusted under 35 U.S.C. 154(b) by 0 days.

(21) Appl. No.: 14/670,606

(22) Filed: Mar. 27, 2015

(65) Prior Publication Data

US 2015/0273278 A1 Oct. 1, 2015

(30) Foreign Application Priority Data

Mar. 28, 2014 (JP) .................. 2014-068846

(51) Int. Cl.
*A63B 37/00* (2006.01)
*A63B 37/02* (2006.01)
*C08K 5/098* (2006.01)

(52) U.S. Cl.
CPC ....... *A63B 37/0051* (2013.01); *A63B 37/0063* (2013.01); *A63B 37/0074* (2013.01); *A63B 37/0075* (2013.01); *A63B 37/0076* (2013.01); *C08K 5/098* (2013.01); *C08K 2201/003* (2013.01)

(58) Field of Classification Search
None
See application file for complete search history.

(56) References Cited

U.S. PATENT DOCUMENTS

| 4,561,657 A | 12/1985 | Tominaga et al. |
| 5,403,010 A | 4/1995 | Yabuki et al. |
| 6,278,010 B1 * | 8/2001 | Tsou ............ C07F 3/003 556/131 |
| 6,561,929 B2 * | 5/2003 | Watanabe ........ A63B 37/0003 473/377 |
| 2004/0133023 A1 | 7/2004 | Hasegawa et al. |
| 2008/0194359 A1 | 8/2008 | Higuchi et al. |
| 2010/0273575 A1 | 10/2010 | Watanabe |
| 2012/0142453 A1 * | 6/2012 | Mikura ............ A63B 37/0003 473/372 |

FOREIGN PATENT DOCUMENTS

| JP | 59-141961 A | 8/1984 |
| JP | 60-92781 A | 5/1985 |
| JP | 6-154357 A | 6/1994 |
| JP | 2003-12600 A | 1/2003 |
| JP | 2004-161640 A | 6/2004 |
| JP | 2008-194471 A | 8/2008 |
| JP | 2010-253268 A | 11/2010 |

OTHER PUBLICATIONS

Kroschwitz; Concise Encyclopedia of Polymer and Engineering; 1990; p. 15.*

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball traveling a great distance on driver shots. The present invention provides a golf ball comprising a constituting member formed from a rubber composition containing (a) a base rubber, (b) an $\alpha$, $\beta$-unsaturated carboxylic acid having 3 to 8 carbon atoms and/or a metal salt thereof as a co-crosslinking agent, and (c) an crosslinking initiator, wherein (b) the $\alpha$, $\beta$-unsaturated carboxylic acid having 3 to 8 carbon atoms and/or the metal salt thereof meets the following conditions (1) and (2) in a volume based distribution, when measuring a particle size thereof with a laser diffraction particle size analyzer;

(1) a mode particle size is more than 10 μm and 50 μm or less, and
(2) a volume ratio of particles having a particle size ranging from 6 μm to 300 μm is 60% or more.

16 Claims, 8 Drawing Sheets

GOLF BALL

FIELD OF THE INVENTION

The present invention relates to a golf ball traveling a great distance on driver shots, in particular, an improvement of a constituting material of a golf ball.

DESCRIPTION OF THE RELATED ART

As a method for improving a flight distance on driver shots, for example, there is a method of using a core having a hardness distribution in which the hardness increases toward the surface of the core from the center thereof. The core having this hardness distribution increases the launch angle and lowers the spin rate. A golf ball having a higher launch angle and a low spin rate travels a great distance.

For example, Japanese Patent Publications No. HA-154357 A, No. 2008-194471 A, and No. 2010-253268 A disclose a core having a hardness distribution. Japanese Patent Publication No. H6-154357 A discloses a two-piece golf ball comprising a core formed of a rubber composition containing a base rubber, a co-crosslinking agent, and an organic peroxide, and a cover covering said core, wherein the core has the following hardness distribution according to JIS-C type hardness meter readings: (1) hardness at center: 58-73, (2) hardness at 5 to 10 mm from center: 65-75, (3) hardness at 15 mm from center: 74-82, (4) surface hardness: 76-84, wherein hardness (2) is almost constant within the above range, and the relation (1)<(2)<(3)≤(4) is satisfied.

Japanese Patent Publication No. 2008-194471 A discloses a solid golf ball comprising a solid core and a cover layer that encases the core, wherein the solid core is formed of a rubber composition composed of 100 parts by mass of a base rubber that includes from 60 to 100 mass % of a polybutadiene rubber having a cis-1,4 bond content of at least 60% and synthesized using a rare-earth catalyst, from 0.1 to 5 parts by mass of an organic sulfur compound, an unsaturated carboxylic acid or a metal salt thereof, an inorganic filler, and an antioxidant; the solid core has a deformation amount of from 2.0 mm to 4.0 mm, when applying a load from an initial load of 10 kgf to a final load of 130 kgf and has the hardness distribution shown in the following table.

TABLE 1

| Hardness distribution in solid core | Shore D harness |
| --- | --- |
| Center | 30 to 48 |
| Region located 4 mm from center | 34 to 52 |
| Region located 8 mm from center | 40 to 58 |
| Regiors located 12 mm from center (Q) | 43 to 61 |
| Region located 2 to 3 mm inside of surface (R) | 36 to 54 |
| Surface (S) | 41 to 59 |
| Hardness difference [(Q) − (S)] | 1 to 10 |
| Hardness difference [(S) − (R)] | 3 to 10 |

Japanese Patent Publication No. 2010-253268 A discloses a multi-piece solid golf ball comprising a core, an envelope layer encasing the core, an intermediate layer encasing the envelope layer, and a cover which encases the intermediate layer and has formed on a surface thereof a plurality of dimples, wherein the core is formed primarily of a rubber material and has a hardness which gradually increases from a center to a surface thereof, the hardness difference in JIS-C hardness units between the core center and the core surface being at least 15 and, letting (I) be the average value for cross-sectional hardness at a position about 15 mm from the core center and at the core center and letting (II) be the cross-sectional hardness at a position about 7.5 mm from the core center, the hardness difference (I)-(II) in JIS-C units being within ±2; and the envelope layer, intermediate layer and cover have hardness which satisfy the condition: cover hardness>intemiediate layer hardness>envelope layer hardness.

In addition, acrylic acid or zinc acrylate is blended as a co-crosslinking agent in a core of a golf ball. Techniques for improving the co-crosslinking agent are disclosed, for example, in Japanese Patent Publications No. S59-141961 A, No. S60-92781 A, No. 2003-12600 A, and No. 2004-161640.

Japanese Patent Publication No. S59-141961 A discloses a golf ball comprising a core formed from a rubber composition, wherein the rubber composition contains, as a co-crosslinking agent, zinc acrylate whose surface is coated with one or more kinds of a higher fatty acid. Japanese Patent Publication No. S60-92781 A discloses a golf ball comprising a core formed from a rubber composition, wherein the rubber composition contains, as a co-crosslinking agent, zinc acrylate whose surface is coated with one or more kinds of a metal salt of a higher fatty acid.

Japanese Patent Publication No, 2003-12600 A discloses a zinc acrylate composition containing zinc acrylate and an anionic surfactant, wherein a ratio of zinc acrylate particle having a particle size of 300 μm or more measured by a dry method in a total of particles is 20 mass % or less, a medium value of zinc acrylate particle size measured by a dry method is 10 to 300 μm, and a ratio of the medium value (A) of zinc acrylate particle size measured by a dry method to a medium value (B) of zinc acrylate particle size measured by a wet method exceeds 2.

Japanese Patent Publication No. 2004-161640 discloses a method for manufacturing zinc acrylate, wherein zinc oxide is dispersed in any solvent of (a) an aliphatic hydrocarbon solvent, a mixture solvent of (b) the aliphatic hydrocarbon solvent and an aromatic hydrocarbon solvent, or a mixture solvent of (c) the aromatic hydrocarbon solvent and an alcohol, and followed by carrying out a reaction between acrylic acid and zinc oxide in the solvent.

SUMMARY OF THE INVENTION

An object of the present invention is to provide a golf ball traveling a great distance on driver shots.

The golf ball of the present invention which has solved the above problem comprises a constituting member formed from a rubber composition containing (a) a base rubber, (b) an α, β-unsaturated carboxylic acid having 3 to 8 carbon atoms and/or a metal salt thereof as a co-crosslinking agent, and (c) an crosslinking initiator, wherein (b) the α, β-unsaturated carboxylic acid having 3 to 8 carbon atoms and/or the metal salt thereof meets the following conditions (1) and (2) in a volume based distribution, when measuring a particle size thereof with a laser diffraction particle size analyzer;

(1) a mode particle size is more than 10 μm and 50 μm or less, and (2) a volume ratio of particles having a particle size ranging from 6 μm to 300 μm is 60% or more.

That is, the present invention is characterized in that, the α, β-unsaturated carboxylic acid having 3 to 8 carbon atoms and/or the metal salt thereof being added in the rubber composition for forming the constituting member of the golf ball has a specific particle size distribution. Such an α, β-unsaturated carboxylic acid having 3 to 8 carbon atoms and/or the metal salt thereof imparts excellent kneadability to the rubber composition. Furthermore, the spherical core formed from the above rubber composition has a high degree of outer-hard inner-soft structure. The core having a high degree of outer-hard inner-soft structure lowers a spin rate on driver shots and imparts a great flight distance to the golf ball.

The present invention provides a golf ball traveling a great distance on driver shots.

DESCRIPTION OF THE PREFERRED EMBODIMENT

Figure 1:
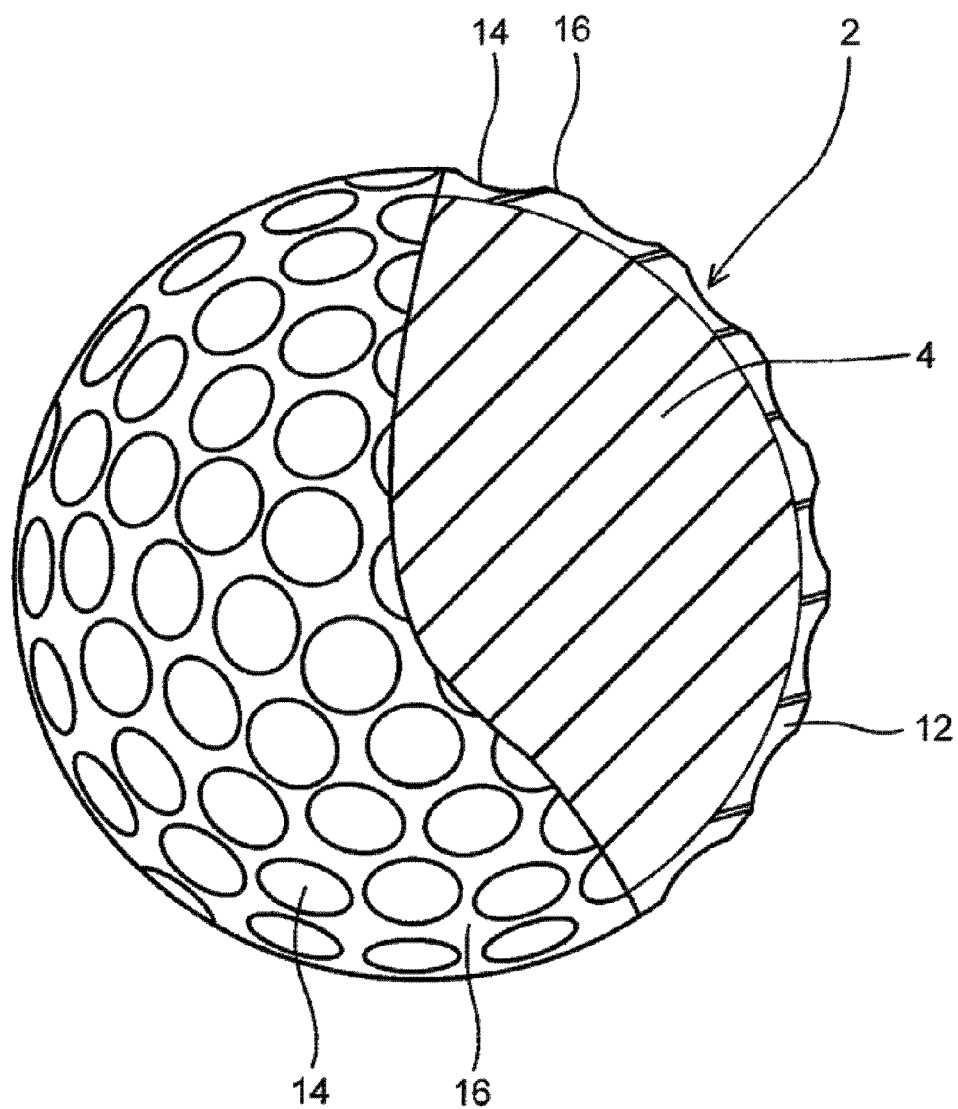
FIG. 1 is a partially cutaway sectional view showing a golf ball according to an embodiment of the present invention.
Figure 2:
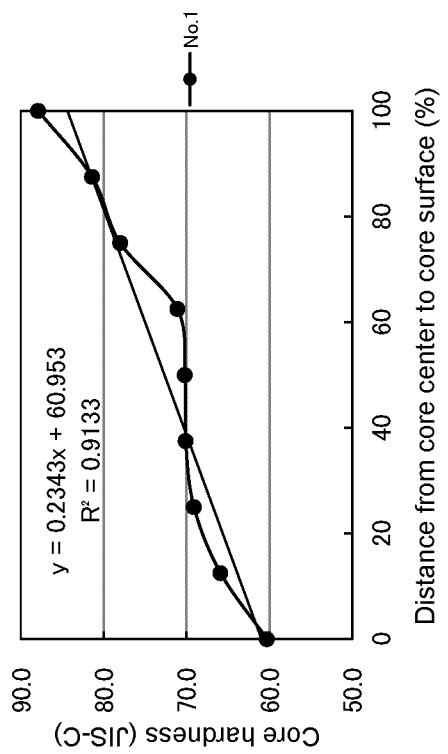
FIG. 2 is a graph showing a hardness distribution of a core.
Figure 3:
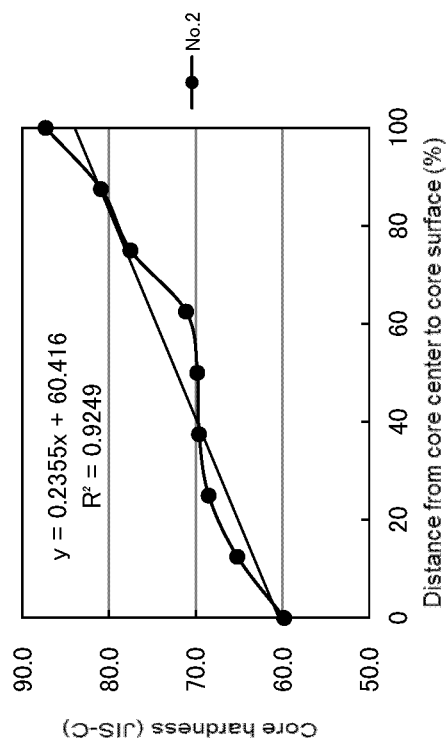
FIG. 3 is a graph showing a hardness distribution of a core.
Figure 4:
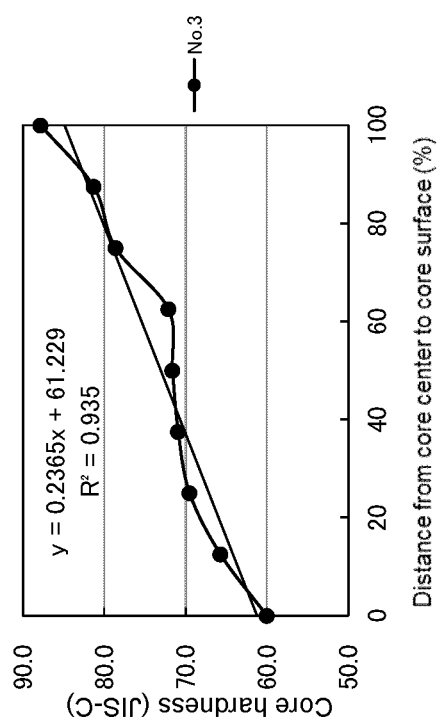
FIG. 4 is a graph showing a hardness distribution of a core.
Figure 5:
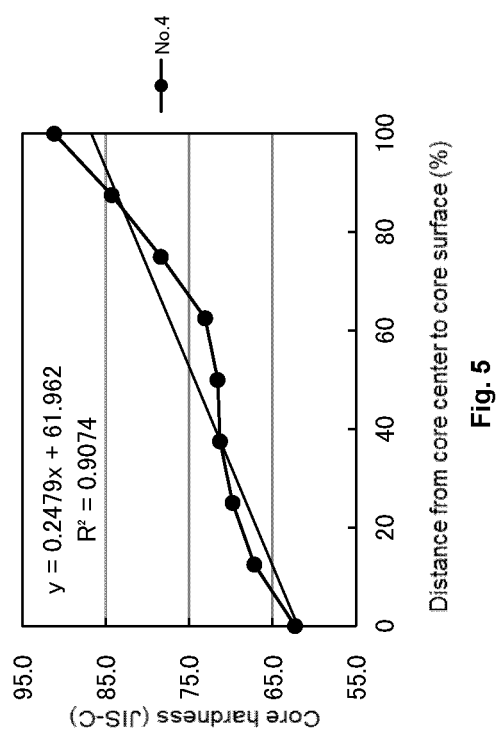
FIG. 5 is a graph showing a hardness distribution of a core.
Figure 6:
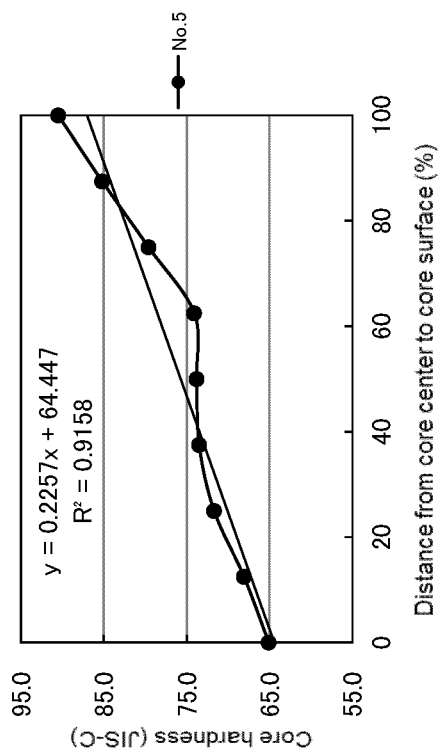
FIG. 6 is a graph showing a hardness distribution of a core.
Figure 7:
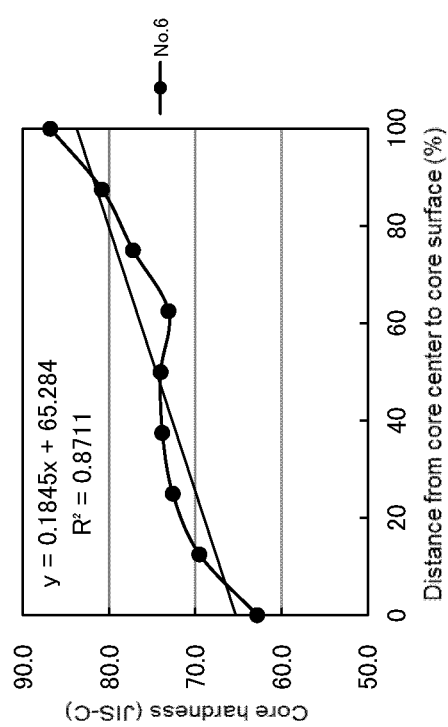
FIG. 7 is a graph showing a hardness distribution of a core.
Figure 8:
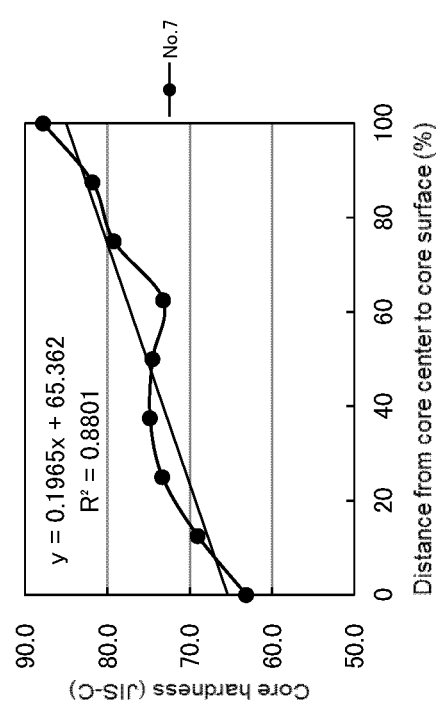
FIG. 8 is a graph showing a hardness distribution of a core.

The present invention provides a golf ball comprising a constituting member formed from a rubber composition containing (a) a base rubber, (b) an α, β-unsaturated carboxylic add having 3 to 8 carbon atoms and/or a metal salt thereof as a co-crosslinking agent, and (c) an crosslinking initiator, wherein (b) the α, β-unsaturated carboxylic acid having 3 to 8 carbon atoms and/or the metal salt thereof meets the following conditions (1) and (2) in a volume based distribution, when measuring a particle size thereof with a laser diffraction particle size analyzer;

(1) a mode particle size is more than 10 μm and 50 μm or less, and (2) a volume ratio of particles having a particle size ranging from 6 μm to 300 μm is 60% or more.

First, (a) the base rubber used in the present invention will be explained. As (a) the base rubber, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Among them, typically preferred is a high cis-polybutadiene having a cis-1,4 bond content of 40% or more, more preferably 80% or more, and even more preferably 90% or more in view of its superior resilience property.

The high-cis polybutadiene preferably has a 1,2-vinyl bond content of 2 mass % or less, more preferably 1.7 mass % or less, and even more preferably 1.5 mass % or less. If the 1,2-vinyl bond content is excessively high, the resilience may be lowered.

The high-cis polybutadiene preferably includes one synthesized using a rare earth element catalyst. When a neodymium catalyst, which employs a neodymium compound of a lanthanum series rare earth element compound, is used, a polybutadiene rubber having a high content of cis-1,4 bond and a low content of 1,2-vinyl bond is obtained with excellent polymerization activity. Such a polybutadiene rubber is particularly preferred.

The high-cis polybutadiene preferably has a Mooney viscosity ($ML_{1+4}$(100° C.)) of 30 or more, more preferably 32 or more, even more preferably 35 or more, and preferably has a Mooney viscosity ($ML_{1+4}$(100° C.)) of 140 or less, more preferably 120 or less, even more preferably 100 or less, most preferably 80 or less. It is noted that the Mooney viscosity ($ML_{1+4}$ (100° C.)) in the present invention is a value measured according to JIS K6300 using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, most preferably 2.6 or more, and preferably has a molecular weight distribution Mw/Mn of 6.0 or less, more preferably 5.0 or less, even more preferably 4.0 or less, most preferably 3.4 or less. If the molecular weight distribution (Mw/Mn) of the high-cis polybutadiene is excessively low, the processability may deteriorate. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", manufactured by Tosoh Corporation) using a differential refractometer as a detector under the conditions of column: GMHHXL (manufactured by Tosoh Corporation), column temperature: 40° C., and mobile phase: tetrahydrofuran, and calculated by converting based on polystyrene standard.

Next, (b) the α,β-unsaturated carboxylic acid having 3 to 8 carbon atoms and/or the metal salt thereof will be explained. (b) The α,β-unsaturated carboxylic acid having 3 to 8 carbon atoms and/or the metal salt thereof is blended as a co-crosslinking agent in the rubber composition and has an action of crosslinking a rubber molecule by graft polymerization to a base rubber molecular chain. In the case that the rubber composition used in the present invention contains only the α,β-unsaturated carboxylic acid having 3 to 8 carbon atoms as the co-crosslinking agent, the rubber composition preferably further contains (d) a metal compound. Neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms. Further, in the case of using the α,β-unsaturated carboxylic acid having 3 to 8 carbon atoms and the metal salt thereof in combination, (d) the metal compound may be used as an optional component.

The α,β-unsaturated carboxylic acid having 3 to 8 carbon atoms includes, for example, acrylic acid, methacrylic acid, fumaric acid, maleic acid, crotonic acid, and the like. Among them, acrylic acid and methacrylic acid are preferable.

Examples of the metals constituting the metal salts of the α,β-unsaturated carboxylic acid having 3 to 8 carbon atoms include: monovalent metal ions such as sodium, potassium, lithium or the like; divalent metal ions such as magnesium, calcium, zinc, barium, cadmium or the like; trivalent metal ions such as aluminum or the like; and other metal ions such as tin, zirconium or the like. The above metal ions can be used solely or as a mixture of at least two of them. Among these metal ions, divalent metal ions such as magnesium, calcium, zinc, barium, cadmium or the like are preferable. Use of the divalent metal salts of the α,β-unsaturated carboxylic acid having 3 to 8 carbon atoms easily generates a metal crosslinking between the rubber molecules. Especially as the divalent metal salt, the zinc salt is preferable, and zinc acrylate is more preferable because zinc acrylate enhances the resilience of the resultant golf ball. The α,β-unsaturated carboxylic acid having 3 to 8 carbon atoms and/or the metal salt thereof may be used solely or in combination at least two of them.

In the present invention, (b) the α, β-unsaturated carboxylic acid having 3 to 8 carbon atoms and/or the metal salt thereof meets the following conditions (1) and (2) in a volume based distribution, when measuring a particle size thereof with a laser diffraction particle size analyzer;

(1) a mode particle size is more than 10 μm and 50 μm or less, and (2) a volume ratio of particles having a particle size ranging from 6 μm to 300 μm is 60% or more.

By using (b) the α,β-unsaturated carboxylic acid having 3 to 8 carbon atoms and/or the metal salt thereof meeting the above conditions (1) and (2), the rubber composition can be kneaded uniformly. Furthermore, the spherical core formed from the rubber composition has a high degree of outer-hard inner-soft structure. As a result, the golf ball having a low spin rate on driver shots and travelling a great distance can be obtained.

The mode particle size is a particle size having a maximum value (maximum frequency value) in a volume based frequency distribution graph. The mode particle size is preferably more than 10 μm, more preferably 13 μm or more, and even more preferably 15 μm or more. Furthermore, the mode particle size is preferably 50 μm or less, more preferably 45 μm or less, and even more preferably 40 μm or less. If the mode particle size falls within the above range, kneadability is good, and the resultant constituting member (particularly in case that the constituting member is a spherical core) of the golf ball has a higher degree of outer-hard inner-soft structure. As a result, the golf ball having a lower spin rate on driver shots and travelling a greater distance can be obtained.

The volume ratio of the particles having a particle size ranging from 6 μm to 300 μm is a value obtained by subtracting a cumulative volume ratio V % (6 μm) at the particle size of 6 μm from a cumulative volume ratio V % (300 μm) at the particle size of 300 μm in a volume based cumulative distribution graph (the fine particle size side is 0%, and the coarse particle size side is 100%). The volume ratio of the particles having a particle size ranging from 6 μm to 300 μm is preferably 60% or more, and more preferably 65% or more. If the volume ratio of the particles having a particle size ranging from 6 μm to 300 μm is less than 60%, the ratio of the fine particles having a particle size of less than 6 μm or the coarse particles having a particle size of more than 300 μm becomes large. As a result, the resultant rubber composition may not be kneaded uniformly. Furthermore, when the spherical core is formed from the rubber composition, the spherical core has a lowered degree of outer-hard inner-soft structure.

In one preferable embodiment of the present invention, (b) the α, β-unsaturated carboxylic acid having 3 to 8 carbon atoms and/or the metal salt thereof further meets the following condition (3) in a volume based distribution, when measuring a particle size thereof with a laser diffraction particle size analyzer;

(3) d10 is 6 μm or more, and a volume ratio of particles having a particle size of 200 μm or less is 75% or more.

d10 is a particle size (μm) whose cumulative volume ratio V % is 10% in the volume based cumulative distribution graph. d10 is preferably 6 μm or more, and more preferably 6.5 μm or more. If d10 is less than 6 μm, the volume ratio of the fine particle having a particle size less than 6 μm becomes large, thus the resultant constituting member has a lowered degree of outer-hard inner-soft structure. The upper limit of d10 is not particularly limited, but preferably 15 μm, and more preferably 12 μm.

In addition, the volume ratio of the particles having a particle size of 200 μm or less is preferably 75% or more, and more preferably 76% or more. If the volume ratio of the particles having a particle size of 200 μm or less is 75% or more, the volume ratio of the coarse particles having a particle size of more than 200 μm becomes small, thus the rubber composition is easy to be kneaded uniformly. The volume ratio of the particles having a particle size of 200 μm or less is not particularly limited, but preferably 98% or less, and more preferably 95% or less.

The particles of (b) the α,β-unsaturated carboxylic add having 3 to 8 carbon atoms and/or the metal salt thereof are sometimes treated with a higher fatty acid and/or a salt thereof in order to improve the processability in the rubber composition. In this case, in the present invention, (b) the α,β-unsaturated carboxylic acid having 3 to 8 carbon atoms and/or the metal salt thereof before treated with the higher fatty acid and/or the salt thereof preferably meets the conditions (1) to (3).

The particle size is measured or calculated by the following method. That is, a dry powder sample is set into a dry-type unit of a laser diffraction particle size analyzer (LMS-2000e type available from Seishin Enterprise Co., Ltd,), the refractive index of the sample is set as 1.52, and then measurement is carried out. Based on the obtained volume based frequency distribution graph and the cumulative distribution graph, the mode particle size and the volume ratio of the particle are calculated.

Next, the method for manufacturing (b) the α,β-unsaturated carboxylic acid having 3 to 8 carbon atoms and/or the metal salt thereof meeting the above conditions (1) to (3) used in the present invention, will be described based on the method for manufacturing zinc acrylate. The method for manufacturing zinc acrylate is not particularly limited, for example, zinc acrylate can be obtained by dispersing zinc oxide in any solvent of (x) an aliphatic hydrocarbon solvent, a mixture solvent of (x) the aliphatic hydrocarbon solvent and (y) an aromatic hydrocarbon solvent, or a mixture solvent of (y) the aromatic hydrocarbon solvent and (z) an alcohol, and followed by carrying out a reaction between acrylic acid and zinc oxide in the above solvent.

Examples of (x) the aliphatic hydrocarbon solvent include cyclic or chain alkanes such as pentane, isopentane, hexane, isohexane, heptane, isoheptane, octane, isooctane, nonane, isononane, cyclohexane, cycloheptane, cyclooctane, cyclononane. Among them, alkanes having 6 to 8 carbon atoms, namely, hexane, heptane, octane are preferably used. This is because alkanes having 6 to 8 carbon atoms facilitate the removal of water generated in the reaction from the system by virtue of azeotropy. Particularly, it is preferred to use the solvent having an interfacial tension of 55 dynes/cm or less to water. This is because the zinc acrylate is obtained in a thicker and longer crystal than zinc acrylate obtained in the case of using toluene as the solvent. As the reaction solvent, the aliphatic hydrocarbon solvent may be used solely, or be mixed with the aromatic hydrocarbon solvent which will be described later to use a mixture solvent.

(y) The aromatic hydrocarbon solvent is at least one kind selected from toluene, xylene, mesitylene, cumene, cumene, styrene, benzene and ethylbenzene. Among them, toluene and xylene are preferably used. This is because toluene and xylene facilitate the removal of water generated in the reaction from the system by virtue of azeotropy. The mixing ratio of the aliphatic hydrocarbon solvent and the aromatic hydrocarbon solvent is not limited, but from the viewpoint of inhibiting a secondary aggregation of zinc acrylate, the mass ratio of the aliphatic hydrocarbon solvent and the aromatic hydrocarbon solvent is preferably 10:0 to 6:4, and more preferably 10:0 to 8:2. The crystal form changes with the mixing amount of the aromatic hydrocarbon solvent and the aliphatic hydrocarbon solvent. If the mixing amount of the aliphatic hydrocarbon solvent such as heptane is large, the obtained crystal becomes thick, and if the mixing amount of the aromatic hydrocarbon solvent is large, the obtained crystal becomes thin and long.

As (z) the alcohol, an alcohol having 1 to 8 carbon atoms is preferable, and examples thereof include methanol, ethanol, propanol, isopropanol, butanol, isobutanol, pentanol, hexanol, heptanol and octanol. Among them, isopropanol, butanol, isobutanol and isopentanol are preferably used. This is because isopropanol, butanol, isobutanol and isopentanol facilitate the removal of water generated in the reaction from the system by virtue of azeotropy. The alcohol is used as a mixture solvent with the aromatic hydrocarbon solvent. The mixing ratio of the alcohol and the aromatic hydrocarbon solvent is not limited, but the mass ratio of the alcohol and the aromatic hydrocarbon solvent is preferably 10:0 to 1:9, and more preferably 10:0 to 3:7. If the mixing amount of the alcohol becomes large, the crystal grows even in the solvent as well as during the process of synthetic reaction, thus the crystal form becomes so thick that the crystal is hardly broken.

In the above manufacturing method, zinc acrylate is obtained by carrying out a reaction between zinc oxide and acrylic add, while dispersing zinc oxide in the reaction solvent. It is also possible to carry out a reaction between acrylic add and zinc oxide in the presence of a higher fatty add having 12 to 30 carbon atoms in the reaction solvent.

Specifically, a predetermined amount of the solvent is charged into a reactor furnished with a mixer having a sufficient agitation ability and a heating-cooling device, zinc oxide is added thereto while agitating the solvent to prepare a suspension.

In addition, zinc oxide with a high purity is preferable, but zinc oxide may contain zinc hydroxide as an impurity. The amount of the reaction solvent to be added depends on the type of the solvent to be used, but is preferably 1 to 7 times that of zinc oxide, more preferably 1 to 5 times that of zinc oxide, and particularly preferably 1.3 to 4.5 times that of zinc oxide in terms of a mass conversion. If the amount of the solvent is large, the unreacted material is localized in the upper part of the reaction liquid, thus the purity tends to decrease. If the amount of the solvent is reduced, the viscosity of the reaction liquid increases, thus the reaction liquid is uniformized, the agitation efficiency improves, and the purity of zinc acrylate improves. Furthermore, since the viscosity increases and becomes uniformized, the adhesion to the impeller during kneading decreases. In addition, if the amount of the solvent exceeds 5 times that of zinc oxide, the above purity improvement effect tends to decrease. On the other hand, if the amount of the solvent is less than 1 time that of zinc oxide, agitation tends to become difficult.

Subsequently, the reaction liquid is cooled where necessary. Acrylic acid is added into the reaction liquid to carry out a reaction between acrylic acid and zinc oxide while keeping the reaction liquid at the temperature ranging from 10 to 70° C., preferably 15 to 50° C., to produce zinc acrylate. The amount of acrylic acid is not particularly limited, as long as the amount of acrylic acid is enough to reaction with zinc oxide, but generally the amount of acrylic acid is preferably 50 to 250 parts by mass, and more preferably 50 to 200 parts by mass with respect to 100 parts by mass of zinc oxide. In addition, if an excessive amount of acrylic add is used, the excessive acrylic add may be removed by distillation and dried together with the organic solvent and water generated in the reaction when separating and recovering zinc acrylate. Acrylic acid may be used in any state, and may contain a lithe amount of water, but acrylic acid which is not diluted by water is preferable. In addition, a polymerization inhibitor such as hydroquinone and hydroquinone monomethyl ether may be contained in acrylic acid. The addition and reaction time of acrylic acid can be suitably selected in a range of 0.5 to 10 hours, preferably 2 to 7 hours, according to the reaction temperature thereof.

In addition, prior to the addition of acrylic acid, the higher fatty acid may be added into the suspension obtained by dispersing zinc oxide in the reaction solvent, and followed by carrying out a reaction between the higher fatty acid and zinc oxide while keeping the suspension at a temperature in a range from 10 to 70° C., preferably 30 to 50° C., to produce a zinc salt of the higher fatty acid beforehand. At this time, the addition and reaction time of the higher fatty acid can be suitably selected in a range of 0.5 to 10 hours, preferably 1 to 5 hours, according to the reaction temperature thereof. In the case of synthesizing zinc acrylate in the presence of the higher fatty acid, the amounts of acrylic acid and the higher fatty acid are adjusted such that the content of zinc acrylate is 60 to 98 mass %, preferably 70 to 95 mass %. More specifically, the amount of the higher fatty acid is not particularly limited, as long as the amount of the higher fatty acid is enough to react with zinc oxide, and can be determined according to the purpose of using zinc acrylate, but generally is 0 to 150 parts by mass, preferably 10 to 100 parts by mass with respect to 100 parts by mass of zinc oxide. If the amount of the higher fatty acid exceeds 150 parts by mass, the properties of zinc acrylate may decrease, thus this is not preferable.

As the higher fatty acid, a higher fatty acid having 12 to 30 carbon atoms is preferable. Examples of the higher fatty acid having 12 to 30 carbon atoms include lauric acid, myristic acid, palmitic acid, stearic acid, behenic acid, oleic acid and linoleic acid. The higher fatty acid may be used alone or as a mixture of at least two of them. Among the higher fatty acids, palmitic acid and stearic acid are preferably used. In addition, the higher fatty acid may be used directly; may be dissolved in an organic solvent which is the same one as used in the reaction or dissolved in acrylic acid beforehand prior to use, or may be heated and dissolved where necessary prior to use.

In the above manufacturing method, an anionic surfactant or nonionic surfactant may be added together with the higher fatty acid. The amount of the anionic surfactant or the nonionic surfactant to be added is not particularly limited, but preferably 0 to 15 parts by mass, and more preferably 0.03 to 6 parts by mass with respect to 100 parts by mass of zinc oxide. In addition, in the case of using the surfactant, the surfactant may be added into and mixed with the organic solvent used for the reaction beforehand.

The above obtained zinc acrylate may be separated and recovered by a conventional method, for example, a method of filtering water generated in the reaction and the organic solvent in the reactor to separate zinc acrylate and then drying the separated zinc acrylate at a temperature of 10 to 70° C. In addition, in the case that the reactor is a kneader blender provided with a mixer having a scraping impeller, zinc acrylate may be separated and recovered by removing by distillation and drying the excessive acrylic acid, the organic solvent and water generated in the reaction at a temperature of 10 to 70° C., preferably 15 to 50° C., and under a reduced pressure where necessary, while agitating the reaction liquid directly. This method is preferably used in light of equipment simplification. In this case, the distillation and drying time can be suitably selected in a range of 1 to 20 hours according to the temperature thereof.

(b) The α,β-unsaturated carboxylic acid having 3 to 8 carbon atoms and/or the metal salt thereof can be pulverized or classified according to the particle size thereof to control the particle size and the particle size distribution thereof such that they meet the above conditions (1) to (3). The pulverization method is not particularly limited, and examples thereof include methods of using jet mill, ball mill or stamp mill. In addition, examples of the classification method include a classification method using air flow, and a classification method using a sieve.

In the present invention, as the co-crosslinking agent, (b) the α,β-unsaturated carboxylic acid having 3 to 8 carbon atoms and/or the metal salt thereof which is treated with a higher fatty acid and/or a salt of the higher fatty acid is preferably used, and (b) the α,β-unsaturated carboxylic acid having 3 to 8 carbon atoms and/or the metal salt thereof whose particle surface is coated with the higher fatty acid and/or the salt of the higher fatty add is more preferably used. Treating (b) the α,β-unsaturated carboxylic add having 3 to 8 carbon atoms and/or the metal salt thereof with the higher fatty acid and/or the salt of the higher fatty acid improves the processability of the rubber composition. The higher fatty acid is not limited, but the fatty acid having 10 to 30 carbon atoms is preferable, and the fatty acid having 10 to 20 carbon atoms is more preferable. The fatty acid may be either a saturated fatty acid or an unsaturated fatty acid.

Specific examples of the saturated fatty acid (IUPAC name) are decanoic acid (C10), undecanoic acid (C11), dodecanoic acid (C12), tridecanoic acid (C13), tetradecanoic acid (C14), pentadecanoic acid (C15), hexadecnoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), triacontanoic acid (C30), and the like.

Specific examples of the unsaturated fatty acid (IUPAC name) are decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), penacosenoic acid (C25), hexacosenoic acid (C26), heptacosenoic acid (C27), octacosenoic acid (C28), nonacosenoic acid (C29), triacontenoic acid (C30), and the like.

Specific examples of the fatty acid (common name) are capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linoleic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), erotic acid (C26), montanic acid (C28), melissic acid (C30), and the like. The fatty acid may be used alone or as a mixture of at least two of them. Among those described above, palmitic acid, stearic add, behenic acid and oleic add are preferable as the fatty add.

The cation component of the salt of the fatty add may be a metal ion, an ammonium ion or an organic cation. Examples of the metal ion include monovalent metal ions such as sodium, potassium, lithium, silver and the like; bivalent metal ions such as magnesium, calcium, zinc, barium, cadmium, copper, cobalt, nickel, manganese and the like; trivalent metal ions such as aluminum, iron and the like; and other ions such as tin, zirconium, titanium and the like. Among them, the bivalent metal on such as magnesium, calcium, zinc, barium, cadmium, copper, cobalt, nickel, manganese or the like is preferable. These cation components may be used alone or as a mixture of at least two of them.

As the higher fatty acid and/or the salt thereof, stearic acid, oleic acid, zinc stearate and zinc oleate are suitable.

In (b) the α,β-unsaturated carboxylic acid having 3 to 8 carbon atoms and/or the metal salt thereof treated with the higher fatty acid and/or the salt thereof, a content percentage of the higher fatty acid and/or the salt thereof is preferably 1 mass % or more, more preferably 5 mass % or more, even more preferably 10 mass % or more, and is preferably 20 mass % or less, more preferably 15 mass % or less.

Examples of the method for treating the untreated (b) α,β-unsaturated carboxylic acid having 3 to 8 carbon atoms and/or the metal salt thereof with the higher fatty acid and/or the salt thereof are not particularly limited, for example, include the methods described in Japanese Patent Publications No. S59-21640 A and No. S60-92781 A. Specifically, the method comprises mixing the particulate (b) α,β-unsaturated carboxylic acid having 3 to 8 carbon atoms and/or the metal salt thereof, and the higher fatty acid and/or the salt thereof which has been heated and dissolved in an organic solvent such as toluene, xylene or benzene, to form a slurry state, thereby coating the particle surface of the untreated (b) α,β-unsaturated carboxylic acid having 3 to 8 carbon atoms and/or the metal salt thereof.

The amount of (b) the α,β-unsaturated carboxylic acid having 3 to 8 carbon atoms and/or the metal salt thereof in the rubber composition is preferably 15 parts by mass or more, more preferably 20 parts by mass or more, and is preferably 50 parts by mass or less, more preferably 45 parts by mass or less, even more preferably 35 parts by mass or less, with respect to 100 parts by mass of (a) the base rubber. If the amount of (b) the α,β-unsaturated carboxylic add having 3 to 8 carbon atoms and/or the metal salt thereof is less than 15 parts by mass, the amount of (c) the crosslinking initiator which will be described below must be increased in order to obtain the appropriate hardness of the constituting member formed from the rubber composition, which tends to cause the lower resilience. On the other hand, if the amount of (b) the α,β-unsaturated carboxylic acid having 3 to 8 carbon atoms and/or the metal salt thereof exceeds 50 parts by mass, the constituting member formed from the rubber composition becomes excessively hard, which tends to cause the lower shot feeling.

(c) The crosslinking initiator is blended in order to crosslink (a) the base rubber component. As (c) the crosslinking initiator, an organic peroxide is preferred. Specific examples of the organic peroxide include organic peroxides such as dicumyl peroxide, 1,1-bis(t-butylperoxy)-3,3,5-trimethylcyclohexane, 2,5-dimethyl-2,5-di(t-butylperoxy)hexane, and di-t-butyl peroxide. These organic peroxides may be used solely or two or more of these organic peroxides may be used in combination. Among them, dicumyl peroxide is preferably used.

The amount of (c) the crosslinking initiator is preferably 0.2 part by mass or more, more preferably 0.5 part by mass or more, and is preferably 5.0 parts by mass or less, more preferably 2.5 parts by mass or less, with respect to 100 parts by mass of (a) the base rubber. If the amount of (c) the crosslinking initiator is less than 0.2 part by mass, the constituting member formed from the rubber composition becomes so soft that the golf ball may have the lower resilience. If the amount of (c) the crosslinking initiator exceeds 5.0 parts by mass, the amount of (b) the co-crosslinking agent must be decreased in order to obtain the appropriate hardness of the constituting member formed from the rubber composition, resulting in the insufficient resilience or lower durability of the golf ball.

In the case that the rubber composition used in the present invention contains only the α,β-unsaturated carboxylic acid having 3 to 8 carbon atoms as the co-crosslinking agent, the rubber composition preferably further contains (d) a metal compound. (d) The metal compound is not limited as long as it can neutralize (b) the α,β-unsaturated carboxylic acid having 3 to 8 carbon atoms in the rubber composition. (d) The metal compound includes, for example, metal hydroxides such as magnesium hydroxide, zinc hydroxide, calcium hydroxide, sodium hydroxide, lithium hydroxide, potassium hydroxide, copper hydroxide, and the like; metal oxides such as magnesium oxide, calcium oxide, zinc oxide, copper oxide, and the like; metal carbonates such as magnesium carbonate, zinc carbonate, calcium carbonate, sodium carbonate, lithium carbonate, potassium carbonate, and the like. Among these, (d) the metal compound preferably includes the divalent metal compound, more preferably includes the zinc compound. The divalent metal compound reacts with the α,β-unsaturated carboxylic acid having 3 to 8 carbon atoms, thereby forming a metal crosslinking. Use of the zinc compound provides a golf ball with excellent resilience. (d) These metal compounds can be used solely or as a mixture of at least two of them.

The rubber composition used in the present invention preferably further contains (e) an organic sulfur compound. (e) The organic sulfur compound is not particularly limited, as long as it is an organic compound having a sulfur atom in the molecule thereof. Examples thereof include an organic compound having a thiol group (—SH) or a polysulfide bond having 2 to 4 sulfur atoms (—S—S—, —S—S—S—, or —S—S—S—S—), and a metal salt thereof (—SM, —S-M-S—, —S-M-S—S—, —S—S-M-S—S—, —S-M-S—S—S—, or the like; M is a metal atom). Examples of the metal salts are salts of monovalent metals such as sodium, lithium, potassium, copper (I), and silver (I), and salts of divalent metals such as zinc, magnesium, calcium, strontium, barium, titanium (II), manganese (II), iron (II), cobalt (II), nickel (II), zirconium (II), and tin (II). Furthermore, (e) the organic sulfur compound may be any one of aliphatic compounds (aliphatic thiol, aliphatic thiocarboxylic acid, aliphatic dithiocarboxylic acid, aliphatic polysulfides, or the like), heterocyclic compounds, alicyclic compounds (alicyclic thiol, alicyclic thiocarboxylic acid, alicyclic dithiocarboxylic acid, alicyclic polysulfides, or the like), and aromatic compounds. (e) The organic sulfur compound includes, for example, thiols (thiophenols and thionaphthols), polysulfides, thiocarboxylic acids, dithiocarboxylic acids, sulfonamides, thiurams, dithiocarbamates, and thiazoles. (e) These organic sulfur compounds can be used solely or as a mixture of at least two of them.

Examples of the thiophenols include thiophenol; thiophenols substituted with a fluoro group, such as 2-fluorothiophenol, 4-fluorothiophenol, 2,4-difluorothiophenol, 2,5-difluorothiophenol, 2,6-difluorothiophenol, 2,4,5-trifluorothiophenol, 2,4,5,6-tetrafluorothiophenol, pentafluorothiophenol and the like; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol and the like; thiophenols substituted with a bromo group, such as 2-bromothiophenol, 4-bromothiophenol, 2,4-dibromothiophenol, 2,5-dibromothiophenol, 2,6-dibromothiophenol, 2,4,5-tribromothiophenol, 2,4,5,6-tetrabromothiophenol, pentabromothiophenol and the like; thiophenols substituted with an iodo group, such as 2-iodothiophenol, 4-iodothiophenol, 2,4-diiodothiophenol, 2,5-diiodothiophenol, 2,6-diiodothiophenol, 2,4,5-triiodothiophenol, 2,4,5,6-tetraiodoihiophenol, pentaiodothiophenol and the like; or a metal salt thereof. As the metal salt, the zinc salt is preferred.

Examples of the thionaphthols include 2-thionaphthol, 1-thionaphthol, 2-chloro-1-thionaphthol, 2-bromo-1-thionaphthol, 2-fluoro-1-thionaphthol, 2-cyano-1-thionaphthol, 2-acetyl-1-thionaphihol, 1-chloro-2-thionaphthol, 1-bromo-2-thionaphthol, 1-fluoro-2-thionaphthol, 1-cyano-2-thionaphthol, 1-acetyl-2-thionaphthol, and metal salts thereof. Preferable examples include 2-thionaphthol, 1-thionaphthol, and zinc salts thereof.

The polysulfides are organic sulfur compounds having a polysulfide bond, and include, for example, disulfides (for example, diphenylpolysulfides), trisulfides, and tetrasulfides. The thiocarboxylic acids include, for example, a naphthalenethiocarboxylic acid. The dithiocarboxylic acids include, for example, a naphthalenedithiocarboxylic acid. The sulfenamides include, for example, N-cyclohexyl-2-benzothiazole sulfenamide, N-oxydiethylene-2-benzothiazole sulfenamide, and N-t-butyl-2-benzothiazole sulfenamide.

The thiurams include, for example, thiurammonosulfides such as tetramethylthiuram monosulfide; thiuramdisulfides such as tetramethylthiuram disulfide, tetraethylthiuram disulfide, tetrabutylthiuram disulfide; and thiuram tetrasulfides such as dipentamethylenethiuram tetrasulfide. The dithiocarbamates include, for example, zinc dimethyldithiocarbamate, zinc diethyldithiocarbamate, zinc dibutyldithiocarbarnale, zinc ethylphenyldithiocarbamate, sodium dimethyldithiocarbamate, sodium diethyldithiocarbamate, copper (II) dimethyldithiocarbate, iron (III) dimethyldithiocarbamate, selenium diethyldithiocarbamate, and tellurium diethyldithiocarbarnate. The thiazoles include, for example, 2-mercaptobenzothiazole (MBT), dibenzothiazyl disulfide (MBTS), sodium salt, zinc salt, copper salt, or cyclohexylamine salt of 2-mercaptobenzothiazole, 2-(2,4-dinitrophenyl) mercaptobenzothiazole, and 2-(2,6-diethyl-4-morpholinothio) benzothiazole.

(e) The organic sulfur compound preferably includes at least one kind compound selected from the group consisting of thiophenols, diphenylpolysulfides, thionaphthols, thiuramdisulfides, and the metal salts thereof, and more preferably includes 1-thionaphthol and 2-thionaphthol.

The amount of (e) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the amount of (e) the organic sulfur compound is 0.05 part by mass or more, the resilience of the resultant golf ball increases. However, if the amount of (e) the organic sulfur compound exceeds 5.0 parts by mass, the compression deformation amount of the obtained golf ball becomes large and thus the resilience may be lowered.

The rubber composition used in the present invention may include additives such as a pigment, a filler for adjusting weight or the like, an antioxidant, a peptizing agent, and a softener, where necessary. In addition, as described above, in the case that the rubber composition used in the present invention contains only the α,β-unsaturated carboxylic acid having 3 to 8 carbon atoms as the co-crosslinking agent, the rubber composition preferably further contains (d) the metal compound.

Examples of the pigment blended in the rubber composition include a white pigment, a blue pigment, and a purple pigment. As the white pigment, titanium oxide is preferably used. The type of titanium oxide is not particularly limited, but rutile type is preferably used because of the high opacity. The amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The amount of the blue pigment is preferably 0.001 part by mass or more, more preferably 0.05 part by mass or more, and is preferably 0.2 part by mass or less, and more preferably 0.1 part by mass or less, with respect to 100 parts by mass of (a) the base rubber. If the amount of the blue pigment is less than 0.001 part by mass, blueness is insufficient, and the color looks yellowish. If the amount of the blue pigment exceeds 0.2 part by mass, blueness is excessively strong, and a vivid white appearance is not provided.

The filler blended in the rubber composition is mainly used as a weight adjusting agent for adjusting the weight of the golf ball obtained as a final product. The filler may be blended where necessary. The filler includes, for example, inorganic fillers such as zinc oxide, barium sulfate, calcium carbonate, magnesium oxide, tungsten powder, molybdenum powder, or the like. Zinc oxide is preferably used as the weight adjusting agent. It is considered that zinc oxide functions as a vulcanization activator and increases the hardness of the entire constituent member. The amount of the filler is preferably 0.5 part by mass or more, more preferably 1 part by mass or more, and is preferably 30 parts by mass or less, more preferably 25 parts by mass or less, even more preferably 20 parts by mass or less. If the amount of the filler is less than 0.5 part by mass, it is difficult to adjust the weight, while if the amount of the filler exceeds 30 parts by mass, the weight ratio of the rubber component is reduced and thus the resilience tends to be lowered.

The amount of the antioxidant is preferably 0.1 part by mass or more and 1 part by mass or less, with respect to 100 parts by mass of (a) the base rubber. In addition, the amount of the peptizing agent is preferably 0.1 part by mass or more and 5 parts by mass or less, with respect to 100 parts by mass of (a) the base rubber.

The rubber composition used in the present invention is obtained by mixing and kneading (a) the base rubber, (b) the α,β-unsaturated carboxylic acid having 3 to 8 carbon atoms and/or the metal salt thereof, (c) the crosslinking initiator, and other additives where necessary. The kneading can be conducted, without any limitation, with a well-known kneading machine such as a kneading roll, a banbury mixer, or the like.

The constituent member of the golf ball of the present invention can be obtained by molding the rubber composition after kneaded in a mold. The temperature for molding the rubber composition after kneaded into the constituent member is not particularly limited, however, for example, the temperature for molding the rubber composition after kneaded into the spherical core, is preferably 120° C. or more, more preferably 150° C. or more, even more preferably 160° C. or more, and is preferably 170° C. or less. If the molding temperature exceeds 170° C., the surface hardness of the core tends to decrease. The molding pressure preferably ranges from 2.9 MPa to 11.8 MPa. The molding time preferably ranges from 10 minutes to 60 minutes.

The golf ball of the present invention is not particularly limited, as long as it comprises a constituting member formed from the rubber composition. Examples of the constituting member are, for example, one-piece golf ball body, and any constituting member of a golf ball which comprises a spherical core and at least one cover layer covering the spherical core. One preferable embodiment of the present invention is a golf ball comprising a spherical core and at least one cover layer covering the spherical core, wherein the spherical core is formed from the rubber composition. The spherical core formed from the rubber composition has a high degree of outer-hard inner-soft structure. As a result, the spherical core reduces the spin rate on driver shots, thereby improving the flight distance.

Hereinafter, the present invention will be explained based on the embodiment where a golf ball comprises a spherical core and at least one cover layer covering the spherical core, wherein the spherical core is formed from the rubber composition described above. However, the present invention is not limited thereto.

When a hardness is measured at nine points obtained by dividing the radius of the spherical core of the golf ball of the present invention into equal parts having 12.5% interval therebetween, and the hardness is plotted against a distance from the center of the spherical core, $R^2$ of a linear approximation curve obtained by a least square method is preferably 0.90 or higher. If $R^2$ is 0.90 or more, the linearity of the core hardness distribution is enhanced, thus the spin rate on driver shots decreases, resulting in the greater flight distance.

The hardness of the spherical core is JIS-C hardness measured at nine points obtained by dividing the radius of the spherical core into equal parts having 12.5% interval. That is, JIS-C hardness is measured at nine points, namely at distances of 0% (core center), 12.5%, 25%, 37.5%, 50%, 62.5%, 75%, 87.5%, 100% (core surface) from the core center. Next, the measurement results are plotted to make a graph having JIS-C hardness as a vertical axis and distances (%) from the core center as a horizontal axis. In the present invention, $R^2$ of a linear approximation curve obtained from this graph by the least square method is preferably 0.90 or higher. $R^2$ of the linear approximation curve obtained by the least square method indicates the linearity of the obtained plot. In the present invention, $R^2$ of 0.90 or more means that the spherical core has the hardness distribution where the hardness increases linearly or almost linearly. If the spherical core having the hardness distribution where the hardness increases linearly or almost linearly is used for the golf ball, the spin rate on driver shots decreases. As a result, the flight distance on driver shots increases. $R^2$ of the linear approximation curve is more preferably 0.91 or more. The higher linearity provides a greater flight distance on driver shots.

The spherical core preferably has a hardness difference (Hs–Ho) between a surface hardness Hs and a center hardness Ho of 12 or more, more preferably 16 or more, even more preferably 20 or more, and preferably has a hardness difference of 80 or less, more preferably 70 or less, even more preferably 60 or less in JIS-C hardness. If the hardness difference is large, the golf ball travelling a great flight distance due to the high launch angle and low spin rate is obtained.

The spherical core preferably has a center hardness Ho of 30 or more, more preferably 40 or more, even more preferably 45 or more in JIS-C hardness. If the center hardness Ho of the spherical core is less than 30 in JIS-C hardness, the core becomes so soft that the resilience may be lowered. Further, the spherical core preferably has a center hardness Ho of 70 or less, more preferably 65 or less, even more preferably 60 or less in JIS-C hardness. If the center hardness Ho exceeds 70 in JIS-C hardness, the core becomes so hard that the shot feeling tends to be lowered.

The spherical core preferably has a surface hardness Hs of 65 or more, more preferably 70 or more, and preferably has a surface hardness Hs of 100 or less, more preferably 95 or less in JIS-C hardness. If the surface hardness of the spherical core is 65 or more in JIS-C hardness, the spherical core does not become excessively soft, and thus the better resilience is obtained. Further, if the surface hardness of the spherical core is 100 or less in JIS-C hardness, the spherical core does not become excessively hard, and thus the better shot feeling is obtained.

The spherical core preferably has a diameter of 34.8 mm or more, more preferably 36.8 mm or more, even more preferably 38.8 mm or more, and preferably has a diameter of 42.2 mm or less, more preferably 41.8 mm or less, even more preferably 41.2 mm or less, most preferably 40.8 mm or less. If the spherical core has a diameter of 34.8 mm or more, the thickness of the cover does not become too thick and thus the resilience becomes better. On the other hand, if the spherical core has a diameter of 42.2 mm or less, the thickness of the cover does not become too thin and thus the cover functions better.

When the spherical core has a diameter ranging from 34.8 mm to 42.2 mm, a compression deformation amount (a shrinking amount of the spherical core in the compression direction thereof) of the spherical core when applying a load from an initial load of 98 N to a final load of 1275 N to the spherical core is preferably 2.0 mm or more, more preferably 2.8 mm or more, and is preferably 6.0 mm or less, more preferably 5.0 mm or less. If the compression deformation amount is 2.0 mm or more, the shot feeling of the golf ball becomes better. If the compression deformation amount is 6.0 mm or less, the resilience of the golf ball becomes better.

The golf ball cover of the present invention is preferably formed from a cover composition containing a resin component. Examples of the resin component contained in the cover composition include an ionomer resin; a thermoplastic polyurethane elastomer having a commercial name of "Elastollan®" commercially available from BASF Japan Ltd; a thermoplastic polyamide elastomer having a commercial name of "Pebax®" commercially available from Arkema K. K.; a thermoplastic polyester elastomer having a commercial name of "Hytrel®" commercially available from Du Pont-Toray Co., Ltd.; and a thermoplastic styrene elastomer having a commercial name of "Rabalon®" commercially available from Mitsubishi Chemical Corporation; and the like.

The ionomer resin includes a product prepared by neutralizing at least a part of carboxyl groups in a binary copolymer composed of an olefin and an α,β-unsaturated carboxylic acid having 3 to 8 carbon atoms with a metal ion; a product prepared by neutralizing at least a part of carboxyl groups in a ternary copolymer composed of an olefin, an α,β-unsaturated carboxylic acid having 3 to 8 carbon atoms, and an α,β-unsaturated carboxylic acid ester with a metal ion; and a mixture of those. The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Among these, the ionomer resin preferably includes the metal ion-neutralized product of the ethylene-(meth)acrylic acid binary copolymer and the metal ion-neutralized product of the ethylene-(meth)acrylic acid-(meth)acrylic acid ester ternary copolymer.

Specific examples of the ionomer resins include "Himilan®" commercially available from Du Poni-Miisui Polychemicals Co., Ltd, "Surlyn®" commercially available from E.I. du Pont de Nemours and Company, and "Iotek®" commercially available from ExxonMobil Chemical Corporation.

The cover composition constituting the cover of the golf ball of the present invention preferably includes, as a resin component, a thermoplastic polyurethane elastomer or an ionomer resin. In case of using the ionomer resin, it is also preferred to use a thermoplastic styrene elastomer together. The content percentage of the polyurethane or ionomer resin in the resin component of the cover composition is preferably 50 mass % or more, more preferably 60 mass % or more, and even more preferably 70 mass % or more.

The cover composition may further contain, in addition to the resin composition described above, a pigment component such as a white pigment (for example, titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or a fluorescent brightener; and the like, as long as they do not impair the performance of the cover.

The amount of the white pigment (for example, titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the resultant cover. Further, if the amount of the white pigment is more than 10 parts by mass, the durability of the resultant cover may deteriorate.

The slab hardness of the cover composition is preferably appropriately set in accordance with the desired performance of the golf ball. For example, in case of a so-called distance golf ball which focuses on a flight distance, the cover composition preferably has a slab hardness of 50 or more, more preferably 55 or more, and preferably has a slab hardness of 80 or less, more preferably 70 or less in shore D hardness. If the cover composition has a slab hardness of 50 or more, the obtained golf ball has a high launch angle and low spin rate on driver shots and iron shots, and thus the flight distance becomes large. If the cover composition has a slab hardness of 80 or less, the golf ball excellent in durability is obtained. Further, in case of a so-called spin golf ball which focuses on controllability, the cover composition preferably has a slab hardness of less than 50, and preferably has a slab hardness of 20 or more, more preferably 25 or more in shore D hardness. If the cover composition has a slab hardness of less than 50, the flight distance on driver shots can be improved by the core of the present invention, as well as the obtained golf ball readily stops on the green due to the high spin rate on approach shots. If the cover composition has a slab hardness of 20 or more, the abrasion resistance improves. In case of a plurality of cover layers, the slab hardness of the cover composition constituting each layer can be identical or different, as long as the slab hardness of each layer is within the above range.

The methods for molding the cover of the golf ball of the present invention include: a method which comprises molding the cover composition into a hollow-shell, covering the core with a plurality of the hollow-shells and subjecting the core with a plurality of the hollow-shells to compression-molding (preferably a method which comprises molding the cover composition into a half hollow-shell, covering the core with the two half hollow-shells, and subjecting the core with the two half hollow-shells to compression-molding); and a method which comprises injection molding the cover composition directly onto the core.

Compression-molding the half shell to obtain the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, the golf ball cover having a uniform thickness can be formed.

In the case of directly injection molding the cover composition into the cover, the cover composition extruded in a pellet form may be used for injection molding, or the cover material such as the base resin components and the pigment may be dry blended, followed by directly injection molding the blended material. It is preferred to use upper and lower molds having a hemispherical cavity and pimples for forming the cover, wherein a part of the pimples also serves as a retractable hold pin. When molding the cover by injection molding, the hold pin is protruded to hold the core, and the cover composition is charged and then cooled to obtain the cover. For example, the cover composition heated to a temperature ranging from 200° C. to 250° C. is charged into a mold held under a pressure ranging from 9 MPa to 15 MPa for 0.5 to 5 seconds, after cooled for 10 to 60 seconds, the mold is opened to obtain the cover.

The thickness of the cover is preferably 4.0 mm or less, more preferably 3.0 mm or less, and even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and the wear resistance of the cover may deteriorate. If the cover has a plurality of layers, it is preferred that the total thickness of the cover layers falls within the above range.

The concave portions called "dimple" are usually formed on the surface of the golf ball. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, roughly hexagonal shape, and other irregular shape. The shape of the dimples is employed solely or at least two of them may be used in combination.

After the cover is molded, the golf ball is ejected from the mold, and as necessary, the golf ball is preferably subjected to surface treatments such as deburring, cleaning, and sandblast, if desired, a paint film or a mark may be formed. The paint film preferably has a thickness of, but not limited to, 5 μm or larger, more preferably 7 μm or larger, and preferably has a thickness of 50 μm or smaller, more preferably 40 μm or smaller, even more preferably 30 μm or smaller. If the thickness is smaller than 5 μm, the paint film is easy to wear off due to continued use of the golf ball, and if the thickness is larger than 50 μm, the effect of the dimples is reduced, resulting in lowering flying performance of the golf ball.

When the golf ball of the present invention has a diameter in a range from 40 mm to 45 mm, a compression deformation amount of the golf ball (a shrinking amount of the golf ball in the compression direction thereof), when applying a load from an initial load of 98 N to a final load of 1275 N to the golf ball is preferably 2.0 mm or more, more preferably 2.4 mm or more, even more preferably 2.5 mm or more, most preferably 2.8 mm or more, and is preferably 5.0 mm or less, more preferably 4.5 mm or less. If the compression deformation amount is 2.0 mm or more, the golf ball does not become excessively hard, and thus exhibits a good shot feeling. On the other hand, if the compression deformation amount is 5.0 mm or less, the resilience is enhanced.

The golf ball construction is not particularly limited, as long as the golf ball of the present invention comprises a constituent member formed from the rubber composition. FIG. 1 is a partially cutaway sectional view showing a golf ball 2 according to an embodiment of the present invention. The golf ball 2 comprises a spherical core 4, and a cover 12 covering the spherical core 4. A plurality of dimples 14 are formed on the surface of the cover. Other portions than dimples 14 on the surface of the golf ball 2 are land 16. The golf ball 2 is provided with a paint layer and a mark layer outside the cover 12, but these layers are not depicted.

The spherical core preferably has a single layered structure. Unlike a multi-layered structure, the spherical core of the single layered structure does not have an energy loss at the interface of the multi-layered structure when hitting, and thus has an improved resilience. In case that the golf ball comprises a cover, the cover has a structure of at least one layer, for example a single layered structure, or a multi-layered structure of at least two layers. The preferable embodiments of the golf ball of the present invention include, for example, a two-piece golf ball comprising a spherical core and a single layered cover disposed around the spherical core; a multi-piece golf ball comprising a spherical core, and at least two cover layers disposed around the spherical core (including a three-piece golf ball); and a wound golf ball comprising a spherical core, a rubber thread layer formed around the spherical core, and a cover disposed over the rubber thread layer. The present invention can be suitably applied to any one of the above golf balls.

Examples

Hereinafter, the present invention will be described in detail by way of example. The present invention is not limited to examples described below. Various changes and modifications can be made without departing from the spirit and scope of the present invention.

[Evaluation Methods]

(1) Compression Deformation Amount (Mm)

The compression deformation amount of the core or golf ball (shrinking amount of the core or golf ball in the compression direction thereof), when applying a load from an initial load of 98 N to a final load of 1275 N to the core or golf ball, was measured.

(2) Slab Hardness (Shore D Hardness)

Sheets with a thickness of about 2 mm were produced by injection molding the cover composition, and stored at 23° C. for two weeks. Three or more of these sheets were stacked on one another so as not to be affected by the measuring substrate on which the sheets were placed, and the hardness of the stack was measured with a type P1auto loading durometer manufactured by Kobunshi Keiki Co., Ltd., provided with a Shore D type spring hardness tester prescribed in ASTM-D2240.

(3) Hardness Distribution of Core (JIS-C Hardness)

A type P1 auto loading durometer manufactured by Kobunshi Keiki Co., Ltd., provided with a JIS—C type spring hardness tester was used to measure the hardness of the core. The JIS-C hardness measured at the core surface was adopted as the surface hardness of the core. The core was cut into two hemispheres to obtain a cut plane, and the hardness at the central point thereof and the hardness at predetermined distances from the central point were measured. The core hardness was measured at 4 points at predetermined distances from the central point of the cut plane of the core. The core hardness was calculated by averaging the hardness measured at 4 points.

(4) Flight Distance (m) and Spin Rate (Rpm) on Driver Shots

A metal-headed W#1 driver (XXIO, Shaft: 5, loft: 11°, manufactured by Dunlop Sports Limited) was installed on a swing robot M/C manufactured by Golf Laboratories, Inc. The golf ball was hit at a head speed of 40 m/sec, and the spin rate right after hitting the golf ball and the flight distance (the distance from the launch point to the stop point) were measured. This measurement was conducted twelve times for each golf ball, and the average value thereof was adopted as the measurement value for the golf ball. In addition, a sequence of photographs of the hit golf ball were taken for measuring the spin rate right after hitting the golf ball. In Tables 3 and 4, the flight distance and spin rate on driver shots are shown as the difference from those of the golf ball No. 6.

(5) Measurement of Particle Size

The dry powder sample was set into the dry-type unit of the laser diffraction particle size analyzer (Type: LMS-2000e, available from Seishin Enterprise Co., Ltd), the refractive index of the sample was set as 1.52, and the particle size of the sample was measured. From the obtained volume based frequency distribution graph (the frequency distribution graph obtained by dividing the particle size from 0.02 µm to 2000 µm in the logarithm plot into 100 parts), the mode particle size was obtained. In addition, from the obtained volume based cumulative distribution graph, the volume ratio % of the particle having a particle size ranging from 6 µm to 300 µm, d10, and the volume ratio % of the particle having a particle size of 200 µm or less were obtained, respectively. It should be noted that, the measured value proximating to the particle size of 300 µm or more was adopted as the cumulative ratio V % (300 µm), the measured value proximating to the particle size of 6 µm or less was adopted as the cumulative ratio V % (6 µm), and the measured value proximating to the particle size of 200 µm or less was adopted as the volume ratio % of the particle having a particle size of 200 µm or less.

[Synthesis of Zinc Acrylate]

Zda-1

1140 g of solvent and 5 moles of zinc oxide were added into a jacketed kneader, the obtained mixture was agitated to obtain a suspension. While keeping the temperature inside the kneader at 5 to 40'C, 10 moles of acrylic acid was slowly added into the suspension for about 3 hours to cause a reaction between acrylic acid and zinc oxide, and then the temperature inside the kneader was set as 40° C. After finishing the addition of acrylic acid, the reaction was further continued for 4 hours at 40° C. Then, while increasing the temperature of the reaction liquid to 50° C. slowly such that a reduced pressure of 20 Torr was obtained, water generated in the reaction and the solvent were removed by distillation and dried for 5 hours, 5 moles of zinc acrylate was obtained. The above obtained zinc acrylate was air flow classified to obtain zinc acrylate (ZDA-1). Zinc acrylate (ZDA-1) has a mode particle size of 22.9 µm and a volume ratio of particles having a particle size ranging from 6 µm to 300 µm of about 70%.

In the air flow classification, the following apparatuses were used.

Supplier; table feeder ZGJ-200

Classifier; CLASSIEL N-5 (available from Seishin Enterprise Co., Ltd)

Collector; bag filter TD-270 (available from Seishin Enterprise Co., Ltd)

ZDA-2

The above obtained unclassified zinc acrylate was air flow classified to obtain zinc acrylate (ZDA-2). Zinc acrylate (ZDA-2) has a mode particle size of 20.0 µm and a volume ratio of particles having a particle size ranging from 6 µm to 300 µm of about 93%.

In the air flow classification, the following apparatuses were used.

Supplier; table feeder ZGJ-200

Classifier; CLASSIEL N-5 (available from Seishin Enterprise Co., Ltd)

Collector; bag filter TD-270 (available from Seishin Enterprise Co., Ltd)

ZDA-3

According to the method described in Japanese Patent Publication No. 2004-161640 A, zinc acrylate (ZDA-3) which has a mode particle size of 10.0 µm and has a volume ratio of particles having a particle size ranging from 6 µm to 300 µm of about 76%, was obtained.

ZDA-4

The unclassified zinc acrylate obtained in the synthesis of ZDA-1 was air flow classified to obtain zinc acrylate (ZDA-4) which has a mode particle size of 18.7 µm and has a volume ratio of particles having a particle size ranging from 6 µm to 300 µm of about 85%.

In the air flow classification, the following apparatuses were used.

Supplier; table feeder ZGJ-200

Classifier; CLASSIEL N-01 (available from Seishin Enterprise Co., Ltd)

Collector; bag filter TD-270 (available from Seishin Enterprise Co., Ltd)

Properties of ZDA-1, ZDA-2, ZDA-3, and ZDA-4 are shown in Table 2.

TABLE 2

| Material particle | Mode particle size (μm) | d10 (μm) | Volume ratio of particle of 6 μm to 300 μm (%) | Volume ratio of particle of 200 μm or less (%) |
|---|---|---|---|---|
| ZDA-1 | 22.9 | 7.0 | 69.95 | 76.6 |
| ZDA-2 | 20.0 | 10.4 | 93.46 | 92.0 |
| ZDA-3 | 10.0 | 3.1 | 75.74 | 99.7 |
| ZDA-4 | 18.7 | 10.5 | 85.48 | 81.5 |
| Sanceler SR | 4.5 | 2.0 | 51.76 | 97.89 |
| ZN-DA90S | 5.6 | 2.1 | 57.82 | 98 |

Zinc stearate was added into the obtained ZDA-1, ZDA-2, ZDA-3, and ZDA-4, respectively, the resultant mixture was mixed to treat the particle surface of zinc acrylate with zinc stearate (zinc stearate treatment amount: 10 mass %).

[Production of Golf Ball]

(1) Production of Core

The rubber compositions having the formulation shown in Tables 3 and 4 were kneaded with a kneading roll and heat-pressed in upper and lower molds, each having a hemispherical cavity, at 170° C. for 20 minutes to prepare the spherical core having a diameter of 39.8 mm.

TABLE 3

| | Golf ball No. | 1 | 2 | 3 | 4 | 5 |
|---|---|---|---|---|---|---|
| Rubber composition (part by mass) | BR730 | 100 | 100 | 100 | 100 | 100 |
| | ZDA-1 (coated with zinc stearate) | 39 | — | — | — | — |
| | ZDA-2 (coated with zinc stearate) | — | 39 | 37 | — | — |
| | ZDA-3 (coated with zinc stearate) | — | — | — | — | 38 |
| | ZDA-4 (coated with zinc stearate) | — | — | — | 41 | — |
| | Sanceler SR | — | — | — | — | — |
| | ZN-DA90S | — | — | — | — | — |
| | Zinc oxide | 5 | 5 | 5 | 5 | 5 |
| | Barium sulfate | *1) | *1) | *1) | *1) | *1) |
| | 2-Thionaphthol | 0.1 | 0.1 | — | 0.1 | 0.1 |
| | Dicumyl peroxide | 0.8 | 0.8 | 0.8 | 0.8 | 0.8 |
| Core hardness distribution (JIS-C) | Center hardness | 60.3 | 59.8 | 60.0 | 62.3 | 65.1 |
| | 12.5% point hardness | 65.9 | 65.2 | 65.7 | 67.2 | 68.1 |
| | 25% point hardness | 69.1 | 68.5 | 69.5 | 69.8 | 71.7 |
| | 37.5% point hardness | 70.1 | 69.6 | 70.9 | 71.3 | 73.5 |
| | 50% point hardness | 70.2 | 69.8 | 71.6 | 71.6 | 73.8 |
| | 62.5% point hardness | 71.1 | 71.1 | 72.1 | 73.1 | 74.1 |
| | 75% point hardness | 78.0 | 77.5 | 78.6 | 78.4 | 79.6 |
| | 87.5% point hardness | 81.4 | 80.9 | 81.3 | 84.3 | 85.2 |
| | Surface hardness | 87.9 | 87.3 | 87.8 | 91.2 | 90.5 |
| | Surface hardness − center hardness | 27.6 | 27.5 | 27.8 | 28.9 | 25.4 |
| | $R^2$ of approximated curve | 0.91 | 0.92 | 0.94 | 0.91 | 0.92 |
| | Slope of approximated curve | 0.23 | 0.24 | 0.24 | 0.25 | 0.23 |
| Core compression deformation amount (mm) | | 3.3 | 3.3 | 3.3 | 3.3 | 3.3 |
| Cover hardness (Shore D) | | 65 | 65 | 65 | 65 | 65 |
| Cover thickness (mm) | | 1.5 | 1.5 | 1.5 | 1.5 | 1.5 |
| Ball | Driver spin rate (rpm) | −110 | −100 | −100 | −80 | −5 |
| | Driver flight distance (m) | 2.5 | 2.0 | 3.0 | 2.0 | 0.0 |
| | Compression deformation amount (mm) | 2.8 | 2.8 | 2.8 | 2.7 | 2.7 |

TABLE 4

| | Golf ball No. | 6 | 7 |
|---|---|---|---|
| Rubber composition (part by mass) | BR730 | 100 | 100 |
| | ZDA-1 (coated with zinc stearate) | — | — |
| | ZDA-2 (coated with zinc stearate) | — | — |
| | ZDA-3 (coated with zinc stearate) | — | — |
| | ZDA-4 (coated with zinc stearate) | — | — |
| | Sanceler SR | 30 | — |
| | ZN-DA90S | — | 30 |
| | Zinc oxide | 5 | 5 |
| | Barium sulfate | *1) | *1) |
| | 2-Thionaphthol | 0.1 | 0.1 |
| | Dicumyl peroxide | 0.8 | 0.8 |
| Core hardness distribution (JIS-C) | Center hardness | 62.8 | 63.1 |
| | 12.5% point hardness | 69.5 | 69.0 |
| | 25% point hardness | 72.6 | 73.3 |
| | 37.5% point hardness | 73.8 | 74.8 |
| | 50% point hardness | 74.0 | 74.5 |
| | 62.5% point hardness | 73.1 | 73.2 |
| | 75% point hardness | 77.2 | 79.2 |
| | 87.5% point hardness | 80.8 | 81.8 |
| | Surface hardness | 86.8 | 87.8 |
| | Surface hardness − center hardness | 24.0 | 24.7 |
| | $R^2$ of approximated curve | 0.87 | 0.88 |
| | Slope of approximated curve | 0.18 | 0.20 |
| Core compression deformation amount (mm) | | 3.1 | 3.1 |
| Cover hardness (Shore D) | | 65 | 65 |
| Cover thickness (mm) | | 1.5 | 1.5 |
| Ball | Driver spin rate (rpm) | 0 | 5 |
| | Driver flight distance (m) | 0 | 0 |
| | Compression deformation amount (mm) | 2.7 | 2.7 |

*1) In Tables 3 and 4, as to the amount of barium sulfate, adjustment was made such that the golf ball had a mass of 45.4 g.

BR730: high-cis polybutadiene (cis-1,4 bond content=96 mass %, 1,2-vinyl bond content=1.3 mass %, Moony viscosity ($ML_{1+4}$(100° C.)=55, molecular weight distribution (Mw/Mn)=3) available from JSR Corporation Sanceler SR: zinc acrylate (product of 10 mass % stearic acid coating) available from Sanshin Chemical Industry Co., Ltd.

ZN-DA90S: zinc acrylate (product of 10 mass % zinc stearate coating) available from Nippon Shokubai Co., Ltd.

Zinc oxide: "Ginrei R" available from Toho Zinc Co., Ltd.
Barium sulfate: "Barium sulfate BD" available from Sakai Chemical Industry Co., Ltd., adjustment was made such that the finally obtained golf ball had a mass of 45.4 g. 2-thionaphthol: available from Tokyo Chemical industry Co., Ltd.
Dicumyl peroxide: "PERCUMYL (registered trademark) D" available from NOF Corporation.

(2) Production of Cover

Next, the cover materials having the formulation shown in Table 5 were extruded with a twin-screw kneading extruder to prepare the cover composition in a pellet form. The extruding conditions of the cover composition were a screw diameter of 45 mm, a screw rotational speed of 200 rpm, and screw L/D=35, and the mixture was heated to 150 to 230° C. at the die position of the extruder. The obtained cover composition was injection molded onto the spherical core obtained above to produce the golf ball having the spherical core and the cover covering the spherical core.

TABLE 5

| Cover composition formulation | Parts by mass |
| --- | --- |
| Himilan 1605 | 50 |
| Himilan 1706 | 50 |
| Titanium oxide | 4 |
| Slab hardness (Shore D) | 65 |

Himilan 1605: Sodium ion-neutralized ethylene-methacrylic acid copolymer ionomer resin available from Du Pont-Mitsui Polychemicals Co., Ltd
Himilan 1706: Zinc ion-neutralized ethylene-methacrylic acid copolymer ionomer resin available from Du Pont-Mitsui Polychemicals Co., Ltd It can be seen from the results in Tables 3 and 4, the golf balls (No. 1 to No. 4) of the present invention which comprises a constituting member formed from a rubber composition containing (a) a base rubber, (b) an α, β-unsaturated carboxylic acid having 3 to 8 carbon atoms and/or a metal salt thereof as a co-crosslinking agent, and (c) an crosslinking initiator, wherein (b) the α, β-unsaturated carboxylic acid having 3 to 8 carbon atoms and/or the metal salt thereof meets the following conditions (1) and (2) in a volume based distribution, when measuring a particle size thereof with a laser diffraction particle size analyzer, travel a greater distance on driver shots than the golf balls (No. 5 to No. 7) which use (b) an α, β-unsaturated carboxylic acid having 3 to 8 carbon atoms and/or a metal salt thereof not meeting the following conditions (1) and (2).

(1) a mode particle size is more than 10 μm and 50 μm or less, and (2) a volume ratio of particles having a particle size ranging from 6 μm to 300 μm is 60% or more.

The golf ball of the present invention travels a great distance on driver shots. This application is based on Japanese patent application No. 2014-068846 filed on Mar. 28, 2013, the content of which are hereby incorporated by reference.

The invention claimed is:

1. A golf ball comprising a constituting member formed from a rubber composition containing:
   (a) a base rubber,
   (b) a metal salt of an α,β-unsaturated carboxylic acid having 3 to 8 carbon atoms as a co-crosslinking agent, and
   (c) a crosslinking initiator,
   wherein (b) the metal salt of an α,β-unsaturated carboxylic acid having 3 to 8 carbon atoms meets the following conditions (1), (2), and (3) in a volume based frequency distribution graph obtained by dividing a particle size from 0.02 μm to 2000 μm in a logarithm plot into 100 parts, when measuring a particle size thereof with a laser diffraction particle size analyzer:
   (1) a mode particle size is more than 10 μm and 50 μm or less,
   (2) a volume ratio of particles having a particle size ranging from 6 μm to 300 μm is 60% or more, and
   (3) d10 is 6 μm or more, and a volume ratio of particles having a particle size of 200 μm or less is 75% or more and 98% or less.

2. The golf ball according to claim 1, wherein (b) the metal salt of an α,β-unsaturated carboxylic acid having 3 to 8 carbon atoms as the co-crosslinking agent is treated with a higher fatty acid and/or a salt thereof.

3. The golf ball according to claim 1, wherein (b) the metal salt of an α,β-unsaturated carboxylic acid having 3 to 8 carbon atoms is zinc acrylate.

4. The golf ball according to claim 1, wherein the rubber composition contains (b) the metal salt of an α,β-unsaturated carboxylic acid having 3 to 8 carbon atoms in an amount ranging from 15 parts by mass to 50 parts by mass with respect to 100 parts by mass of (a) the base rubber.

5. The golf ball according to claim 1, wherein the rubber composition further contains (e) an organic sulfur compound.

6. The golf ball according to claim 5, wherein (e) the organic sulfur compound is at least one compound selected from the group consisting of thiophenol and a derivative thereof, diphenylpolysulfide and a derivative thereof, thionaphthol and a derivative thereof, thiuram disulfide and a derivative thereof, and metal salts of these compounds.

7. The golf ball according to claim 5, wherein (e) the organic sulfur compound is 1-thionaphthol and/or 2-thionaphthol.

8. The golf ball according to claim 5, wherein the rubber composition contains (e) the organic sulfur compound in an amount ranging from 0.05 part by mass to 5 parts by mass with respect to 100 parts by mass of (a) the base rubber.

9. The golf ball according to claim 1, wherein the golf ball comprises a spherical core consisting of the constituting member, and at least one cover layer covering the spherical core.

10. The golf ball according to claim 2, wherein the higher fatty acid and/or the salt thereof is a fatty acid having 10 to 30 carbon atoms and/or a salt thereof.

11. The golf ball according to claim 10, wherein the higher fatty acid and/or the salt thereof is selected from the group consisting of stearic acid, oleic acid, zinc stearate and zinc oleate.

12. The golf ball according to claim 2, wherein a content percentage of the higher fatty acid and/or the salt thereof in (b) the metal salt of an α,β-unsaturated carboxylic acid having 3 to 8 carbon atoms treated with the higher fatty acid and/or the salt thereof is 1 mass % or more and 20 mass % or less.

13. The golf ball according to claim 9, wherein the spherical core is such that $R^2$ of a linear approximation curve obtained from a least square method is 0.90 or higher, when JIS-C hardness, which is measured at nine points obtained by dividing the radius of the spherical core into equal parts having 12.5% intervals therebetween, is plotted against a distance (%) from the center of the spherical core.

14. The golf ball according to claim 9, wherein the spherical core has a hardness difference (Hs−Ho) between a surface hardness (Hs) and a center hardness (Ho) thereof of 12 or more in JIS-C hardness.

15. The golf ball according to claim 9, wherein the spherical core has a center hardness (Ho) of 30 or more and 70 or less in JIS-C hardness.

16. The golf ball according to claim 9, wherein the spherical core has a surface hardness (Hs) of 65 or more and 100 or less in JIS-C hardness.

* * * * *